United States Patent [19]
Schneider et al.

[11] 3,992,320
[45] Nov. 16, 1976

[54] MANUFACTURE OF A MODIFIED TITANIUM COMPONENT FOR CATALYSTS OF THE ZIEGLER-NATTA TYPE

[75] Inventors: Paul Schneider, Ludwigshafen; Hans Schick, Mannheim; Heinz Mueller-Tamm; Peter Hennenberger, both of Ludwigshafen, all of Germany

[73] Assignee: BASF Aktiengesellschaft, Ludwigshafen (Rhine), Germany

[22] Filed: Aug. 21, 1975

[21] Appl. No.: 606,441

[30] Foreign Application Priority Data
Aug. 24, 1974 Germany............................ 2441651

[52] U.S. Cl. ............................ 252/429 B; 526/145; 526/349; 526/351
[51] Int. Cl.² ......................................... C08F 4/16
[58] Field of Search ................................ 252/429 B

[56] References Cited
UNITED STATES PATENTS

| 3,186,977 | 6/1965 | Coover et al. .............. 252/429 B X |
| 3,639,375 | 2/1972 | Staiger et al. .............. 252/429 B X |
| 3,937,691 | 2/1976 | Staiger et al. .............. 252/429 B X |

Primary Examiner—Patrick P. Garvin
Attorney, Agent, or Firm—Johnston, Keil, Thompson & Shurtleff

[57] ABSTRACT

A process for the manufacture of a modified titanium-containing component of a catalyst for the polymerization of a α-monoolefins by the Ziegler-Natta method wherein (a) a compound containing titanium and (b) a compound containing phosphorus are ground dry in a vibratory ball mill. It is characteristic of the process that (1) a mill of relatively large useful volume is employed, (2) the mill is first charged with the compound (a) containing titanium, (3) while grinding the material at a low temperature, the compound (b) containing phosphorus is added gradually, thereafter (4) the material is gradually brought to a higher temperature, while continuing the grinding, and is kept at about this temperature for a prolonged period, then (5) a finely particulate 1-alkene polymer having a particular glass transition temperature and a particular intrinsic viscosity is added to the material and finally (6) the material is kept at a low temperature for a prolonged period, while continuing the grinding.

1 Claim, No Drawings

MANUFACTURE OF A MODIFIED TITANIUM COMPONENT FOR CATALYSTS OF THE ZIEGLER-NATTA TYPE

The present invention relates to a process for the manufacture of a modified titanium-containing component of a catalyst for the polymerization of $C_3$- to $C_6$-$\alpha$-monoolefins by the Ziegler-Natta method, wherein a. a titanium-containing compound of the general formula $$TiCl_3 \cdot nAlCl_3$$

where $n$ is a number from 0 to 0.7 and b. a phosphorus-containing compound of the general formula $$O_mPX_3$$

where $m$ is 0 or 1, X is R, OR or $NR_2$ and R is alkyl, aryl, alkaryl or aralkyl of not more than 24 carbon atoms, in a molar ratio (a) : (b) of from 1:0.01 to 1:1, are ground dry, at a grinding acceleration of from 30 to 80 m.sec$^{-2}$, in a vibratory ball mill.

A number of variants of processes of this type are known; their object is principally to provide modified titanium components which, after activation with organo-aluminum compounds or the like, give catalysts which when used in the polymerization of $\alpha$-olefins give high specific yields of poly-$\alpha$-olefins and/or give poly-$\alpha$-olefins containing a relatively high proportion of stereo-regular polymer; cf., eg., German Printed Application No. 1,595,303 and Austrian Pat. Nos. 279,157, 285,932 and 285,933.

The conventional processes have had considerable success; however, it is a certain disadvantage that the reproducibility of the results obtained in the polymerization of $\alpha$-olefins, especially with regard to the specific yields of poly-$\alpha$-olefins, are not entirely satisfactory. The specific yields of identical batches show a relatively large range of fluctuations; this is a handicap in industrial operation.

It is an object of the present invention to provide a process of the type defined above, by means of which it is possible to obtain modified titanium components which, when used as catalysts of the Ziegler-Natta type in the polymerization of $\alpha$-olefins, give precisely reproducible results, in particular in respect of the specific yields of poly-$\alpha$-olefins.

We have found that this object is achieved by using mills which have a relatively large useful volume and by bringing together, and grinding, the starting materials for the manufacture of the modified titanium component under certain specific conditions.

Accordingly, the present invention relates to a process for the manufacture of a modified titanium-containing component of a catalyst for the polymerization of $\alpha$-monoolefins of 3 to 6 carbon atoms by the Ziegler-Natta method, wherein a. a titanium-containing compound of the general formula $$TiCl_3 \cdot nAlCl_3$$

where $n$ is a number from 0 to 0.7 and b. a phosphorus-containing compound of the general formula $$O_mPX_3$$

where $m$ is 0 or 1, X is R, OR or $NR_2$ and R is alkyl, aryl, alkaryl or aralkyl of not more than 24 carbon atoms, in a molar ratio (a):(b) of from 1:0.01 to 1:1, are ground dry, at a grinding acceleration of from 30 to 80 m.sec$^{-2}$, in a vibratory ball mill. In the process according to the invention, 1. a mill of useful volume from 2 to 200 liters, especially from 10 to 50 liters, is used, 2. the mill is first charged with from 0.1 to 120, especially from 6 to 30, kg of the titanium-containing compound (a), 3. thereafter the amount of the phosphorus-containing compound (b) which corresponds to the desired molar ratio is added over a period of from 2 to 100 hours, especially of from 5 to 15 hours, continuously or in small portions, each containing for example up to 10% of the amount to be added, whilst grinding at a material temperature of from $-50°$ to $-5°$ C, especially from $-30°$ to $-15°$ C, 4. the material is then brought to a temperature of from 5° to 60° C, especially from 10° to 30° C, over a period of from 0.1 to 5, especially from 1 to 2, hours, whilst continuing the grinding, and is kept at about these temperatures over a period of from 1 to 100, especially from 5 to 15, hours, 5. from 1 to 10,000, especially from 10 to 100, per cent by weight — based on the titanium-containing compound (a) — of a finely particulate 1-alkene polymer having a particle size of from 1 to 10,000 $\mu$, especially from 1 to 250 $\mu$, a glass transition temperature of from $-100°$ to $+60°$ c, especially from $-20°$ to $+50°$ C, and an intrinsic viscosity $[\eta]$ (measured in decalin at 135° C) of from 0.1 to 20, especially from 2.0 to 3.0, is then added to the material, and finally 6. the material is kept at a temperature of from $-50°$ to $-5°$ C, especially from $-30°$ to $-15°$ C, over a period of from 1 to 30 minutes, whilst continuing the grinding.

Using this process it is not only possible to achieve the above object but also to achieve an additional technical advance, which is that the product — especially if used as a catalyst for the manufacture of propylene polymers — permits the manufacture of polymers which exhibit a particularly low content of material soluble in boiling n-heptane.

Some details of the materials used in the new process are as follows:

Titanium-containing compounds (a) of the above general formula are the relevant conventional compounds, in particular $TiCl_3$ and $TiCl_3 \cdot \frac{1}{3}AlCl_3$; they are commercially available and further comment is therefore superfluous.

Suitable phosphorus-containing compounds (b) of the above general formula are the relevant conventional compounds which conform to this formula, especially those in which X is R or $NR_2$, and R is alkyl of 1 to 8 carbon atoms, above all alkyl of 1 to 4 carbon atoms, or phenyl.

Examples of suitable compound of this type are described, eg., in U.S. Pat. No. 3,186,977.

Specific examples of very suitable phosphorus-containing compounds are triphenylphosphine, triphenylphosphine oxide, tri-n-butylphosphine, tri-n-butylphosphine oxide and hexamethylphosphoric acid triamide. Triphenylphosphine oxide, tri-n-butylphosphine and hexamethylphosphoric acid triamide are particularly suitable.

The 1-alkene polymers to be employed in stage (5) of the process of the invention are in the main homopolymers or copolymers of 1-alkenes of 2 to 8 carbon atoms, especially of 2 to 6 carbon atoms, eg., ethylene, propylene, 1-butene and 4-methyl-1-pentene. We have found that homopolymers of propylene, and copolymers of propylene containing not less than 80 per cent by weight of propylene units, are particularly suitable. Further, we have found that the 1-alkene polymers, if they have been manufactured using Ziegler or Ziegler-Natta catalysts, can be employed successfully even without deactivation of the catalyst constituents they contain.

The modified titanium components for catalysts of the Ziegler-Natta type manufactured by the new process can be employed in the polymerization of $\alpha$-olefins in the relevant conventional manner, ie. the components are in general employed in conjunction with an organo-metallic activator, especially with aluminum-alkyl compounds of the formula Al(alkyl)$_3$ or ClAl(alkyl)$_2$, in which alkyl is of 1 to 8 carbon atoms, and above all in conjunction with triethyl-aluminum or diethyl-aluminum chloride.

Particularly good results are obtained by dry polymerization of $\alpha$-olefins, ie. polymerization in the absence of liquid auxiliary media, but successful polymerization in the presence of such media is also possible. The molecular weight can be adjusted by using conventional regulators, in particular hydrogen. Suitable $\alpha$-olefins to be polymerized are, eg., $\alpha$-olefins of 3 to 8 carbon atoms, in particular propylene, 1-butene and 4-methyl-1-pentene.

EXAMPLE 1

Manufacture of the modified titanium component

The starting materials are a. a titanium compound of the formula TiCl$_3$.⅓AlCl$_3$ and
b. tri-n-butylphosphine in a molar ratio (a):(b) of 1:1/6.

The materials are ground in a vibratory ball mill which has a grinding acceleration of 50 m.sec$^{-2}$ and a useful volume of 50 liters.

In other respects, the procedure followed is that the mill is first charged with 30 kg of the titanium-containing compound (a), the amount of the phosphorus-containing compound (b) which corresponds to the stated molar ratio is then added continuously whilst grinding at a material temperature of $-20°$ C (during which the phosphorus-containing compound becomes homogeneously distributed in the material), the material is then brought to a temperature of 20° C over a period of 2 hours, whilst continuing the grinding, and is kept at this temperature for 5 hours, 20 per cent by weight, based on the titanium-containing compound (a), of a finely particulate propylene homopolymer having a particle size of from 1 to 250 $\mu$, a glass transition temperature of 15° C and an intrinsic viscosity [$\eta$] (measured in decalin at 135° C) of 2.5 are then added to the material, and finally the material is kept at a temperature of $-20°$ C for 10 minutes whilst continuing the grinding.

A modified titanium component, which can be used for polymerization purposes as described below is obtained.

Polymerization using the modified titanium component

The polymerization is carried out in a stirred reactor of 0.8 m$^3$ capacity, under a propylene pressure of 28 atmospheres gauge, regulated so as to remain constant, using an amount of hydrogen of 60 liters (S.T.P)/hr, at a reaction temperature of 75° C, regulated so as to remain constant, in the absence of solvents or diluents, in a bed of 300 kg of finely particulate propylene polymer. The reactor is operated continuously, 17.0 g/hour of the modified titanium component and 36 g/hour of (C$_2$H$_5$)$_2$AlCl being introduced separately from one another. The reactor output consists of finely particulate polypropylene (mean particle size 0.25 mm); the polypropylene contains 14 ppm (by weight) of titanium and 3.8% by weight of material soluble in boiling n-heptane, and has an intrinsic viscosity of 2.5 [dl/g].

If the procedure of this example is continued for a period of 1,000 hours, the yield per hour of polypropylene only fluctuates by $\pm$ 5% about the mean value.

EXAMPLE 2

Manufacture of the modified titanium component

The starting materials are a. a titanium compound of the formula TiCl$_3$.⅓AlCl$_3$ and
b. tri-n-butylphosphine in a molar ratio (a):(b) of 1:1/6.

The materials are ground in a vibratory ball mill which has a grinding acceleration of 50 m.sec$^{-2}$ and a useful volume of 50 liters.

In other respects, the procedure followed is that the mill is first charged with 30 kg of the titanium-containing compound (a), the amount of the phosphorus-containing compound (b) which corresponds to the stated molar ratio is then added continuously whilst grinding at a material temperature of $-20°$ C, the material is then brought to a temperature of 20° C over a period of 2 hours, whilst continuing the grinding, and is kept at this temperature for 5 hours, 20 per cent by weight, based on the titanium-containing compound (a), of a finely perticulate 4-methyl-1-pentene homopolymer having a particle size of from 1 to 250 $\mu$, a glass transition temperature of 48° C and an intrinsic viscosity [$\eta$] (measured in decalin at 135° C) of 2.5 are then added to the material, and finally the material is kept at a temperature of $-20°$ C for 10 minutes whilst continuing the grinding.

A modified titanium component which can be used for polymerization purposes as described below is obtained.

Polymerization using the modified titanium component

The polymerization is carried out in a stirred reactor of 0.8 m$^3$ capacity, under a propylene pressure of 28 atmospheres gauge, regulated so as to remain constant, using an amount of hydrogen of 60 liters (S.T.P.)/hr, at a reaction temperature of 75° C, regulated so as to remain constant, in the absence of solvents or diluents, in a bed of 300 kg of finely particulate propylene polymer. The reactor is operated continuously, 17.0 g/hour of the modified titanium component and 36 g/hour of (C$_2$H$_5$)$_2$AlCl being introduced separately from one another.

The reactor output consists of finely particulate polypropylene (mean particle size 0.25 mm); the polypropylene contains 41 ppm (by weight) of titanium and 3.7% by weight of material soluble in boiling n-heptane, and has an intrinsic viscosity of 2.6 [dl/g].

If the procedure of this example is continued for a period of 1,000 hours, the yield per hour of polypropylene only fluctuates by ± 5% about the mean value.

What we claim is:

1. A process for the manufacture of a modified titanium-containing component of a catalyst for the polymerization of α-monoolefins of 3 to 6 carbon atoms by the Ziegler-Natta method, in which a. a titanium-containing compound of the general formula $$TiCl_3 \cdot nAlCl_3$$

wherein $n$ is a number from 0 to 0.7 and b. a phosphorus-containing compound of the general formula $$O_mPX_3$$

wherein $m$ is 0 or 1, X is R, OR or $NR_2$ and R is alkyl, aryl, alkaryl or aralkyl of not more than 24 carbon atoms, in a molar ratio (a):(b) of from 1:0.1 to 1:1, are ground dry, at a grinding acceleration of from 30 to 80 m.sec$^{-2}$, in a vibratory ball mill, wherein 1. a mill of useful volume from 2 to 200 liters is used,
2. the mill is first charged with from 0.1 to 120 kg of the titanium-containing compound (a),
3. thereafter an amount of the phosphorus-containing compound (b) which corresponds to the desired molar ratio is added over a period of from 2 to 100 hours, continuously or in small portions, whilst grinding at a material temperature of from −50° to −5° C,
4. the material is then brought to a temperature of from 5° to 60° C, over a period of from 0.1 to 5 hours, whilst continuing the grinding, and is kept at about these temperatures over a period of from 1 to 100 hours,
5. from 1 to 10,000 per cent by weight — based on the titanium-containing compound (a) — of a finely particulate 1-alkene polymer having a particle size of from 1 to 10,000 μ, a glass transition temperature of from −100° to 60° C and an intrinsic viscosity [η] (measured in decalin at 135° C) of from 0.1 to 20, is then added to the material, and finally
6. the material is kept at a temperature of from −50° to −5° C, over a period of from 1 to 30 minutes, whilst continuing the grinding.

* * * * *